US009458921B2

(12) United States Patent
Garabello et al.

(10) Patent No.: US 9,458,921 B2
(45) Date of Patent: Oct. 4, 2016

(54) GEARBOX FOR A MOTOR VEHICLE

(71) Applicant: C.R.F. Societa Consortile per Azioni, Orbassano (Torino) (IT)

(72) Inventors: Marco Garabello, Turin (IT); Andrea Piazza, Turin (IT)

(73) Assignee: C.R.F. SOCIETA CONSORTILE PER AZIONI, Orbassano (Torino) (IT)

( * ) Notice: Subject to any disclaimer, the term of this patent is extended or adjusted under 35 U.S.C. 154(b) by 311 days.

(21) Appl. No.: 14/168,545

(22) Filed: Jan. 30, 2014

(65) Prior Publication Data

US 2014/0208882 A1 Jul. 31, 2014

(30) Foreign Application Priority Data

Jan. 30, 2013 (EP) .................................... 13153298

(51) Int. Cl.
| | | |
|---|---|---|
| F16H 61/30 | (2006.01) | |
| F16H 57/04 | (2010.01) | |
| F16H 61/688 | (2006.01) | |
| F16H 61/00 | (2006.01) | |

(52) U.S. Cl.
CPC ...... F16H 57/0446 (2013.01); F16H 61/0031 (2013.01); F16H 61/688 (2013.01); F16H 2061/0034 (2013.01); F16H 2061/0037 (2013.01); F16H 2061/308 (2013.01); Y10T 74/20024 (2015.01)

(58) Field of Classification Search
CPC ........... F16H 57/0446; F16H 61/0031; F16H 61/688; F16H 2061/308; F16H 2061/0034; F16H 2061/0037; Y10T 74/20024
USPC ....................................................... 184/6.12
See application file for complete search history.

(56) References Cited

U.S. PATENT DOCUMENTS

| | | | | |
|---|---|---|---|---|
| 4,640,401 A | * | 2/1987 | Koltookian | ........... F16D 25/123 192/113.36 |
| 4,721,185 A | | 1/1988 | Weigle | |
| 4,732,253 A | * | 3/1988 | Hiramatsu | .......... F16D 25/0638 192/106 F |
| 6,454,074 B1 | * | 9/2002 | Kundermann | .......... F16D 21/06 192/106 F |
| 6,464,059 B1 | * | 10/2002 | Kundermann | .......... F16D 21/06 192/106 F |

(Continued)

FOREIGN PATENT DOCUMENTS

| | | |
|---|---|---|
| DE | 19950443 A1 | 11/2000 |
| DE | 10216002 A1 | 5/2003 |

OTHER PUBLICATIONS

Jun. 17, 2013 European Search Report in European Application No. 13153298.8.

*Primary Examiner* — Michael Riegelman
(74) *Attorney, Agent, or Firm* — Heslin Rothenberg Farley & Mesiti P.C.; Victor A. Cardona, Esq.

(57) ABSTRACT

A gearbox for a motor vehicle including a plurality of forward gear ratios and at least one reverse gear ratio. The gearbox including an electro-hydraulic actuation unit configured for selection and engagement of the gear ratios. The gearbox comprises a first hydraulic pump and a second hydraulic pump. The first hydraulic pump is driven in rotation by an electric motor and is configured for supplying hydraulic fluid taken in from a first intake environment to said electro-hydraulic actuation unit. The second hydraulic pump is driven in rotation by an engine of said motor vehicle and is configured for supplying hydraulic fluid taken in from a second intake environment to said gearbox, for lubrication thereof, and to said first intake environment.

12 Claims, 8 Drawing Sheets

(56) References Cited

U.S. PATENT DOCUMENTS

| | | | | |
|---|---|---|---|---|
| 6,827,191 | B2* | 12/2004 | Kuhstrebe | F16D 13/644 192/113.35 |
| 7,021,445 | B2* | 4/2006 | Brissenden | F16D 25/123 192/103 F |
| 7,114,605 | B2* | 10/2006 | Grosspietsch | F16D 13/583 192/113.36 |
| 7,249,665 | B2* | 7/2007 | Heinrich | F16D 21/06 192/48.61 |
| 7,464,618 | B2* | 12/2008 | Mohlmann | F16H 61/0204 477/143 |
| 7,966,901 | B2* | 6/2011 | Metzinger | F16D 13/52 192/48.619 |
| 7,971,697 | B2* | 7/2011 | Kemmner | F16D 25/123 192/113.34 |
| 8,042,672 | B2 | 10/2011 | Grethel et al. | |
| 8,267,233 | B2* | 9/2012 | Grethel | F16H 57/04 192/113.3 |
| 8,413,777 | B2* | 4/2013 | Lundberg | F16H 61/0206 192/3.58 |
| 8,453,818 | B2* | 6/2013 | Kito | F16D 25/0638 192/106 F |
| 8,511,450 | B2* | 8/2013 | Gold | F16D 25/0638 192/106 F |
| 8,567,580 | B2* | 10/2013 | Czoykowski | F16D 48/0206 192/3.58 |
| 2003/0116396 | A1 | 6/2003 | Kuhstrebe | |
| 2006/0054441 | A1* | 3/2006 | Ruedle | F16H 3/006 192/48.9 |
| 2008/0127760 | A1 | 6/2008 | John et al. | |
| 2008/0210032 | A1* | 9/2008 | Uberti | F16H 61/2807 74/335 |
| 2009/0157271 | A1* | 6/2009 | Garabello | F16H 61/2807 701/55 |
| 2009/0173175 | A1* | 7/2009 | Thery | F16H 3/006 74/331 |

* cited by examiner

FIG. 1

(Prior Art)

GEARBOX FOR A MOTOR VEHICLE

CROSS REFERENCE TO RELATED APPLICATIONS

This application claims priority to European Application No. 13153298.8 filed on Jan. 30, 2013, the entire disclosure of which is incorporated herein by reference.

FIELD OF THE INVENTION

The present invention relates to a gearbox for a motor vehicle including a plurality of forward gear ratios and at least one reverse gear ratio, said gearbox including an electro-hydraulic actuation unit configured for the selection and engagement of said gear ratios, the gearbox comprising a first and a second hydraulic pump, wherein:

the first hydraulic pump is driven in rotation by an electric motor and is configured for supplying a hydraulic fluid, taken from a first intake environment to said electro-hydraulic actuation unit; and the second hydraulic pump is driven in rotation by an engine of said motor vehicle. Gearboxes of the above type are known for example, from the document No, U.S. Pat. No. 8,042,672 B2.

BACKGROUND OF THE INVENTION

In the automotive industry, a by now consolidated choice is that of providing an automatic transmission as equipment for an increasingly larger number of automobiles. Of particular interest are transmissions that envisage the use of an electro-hydraulically or electromechanically actuated gearbox. Transmissions of the former type, which are more relevant to the invention in question, are represented by an embodiment provided by way of example in FIG. 1. In this figure, the reference number. 1 designates a gearbox of a known type proposed by the present applicant, which comprises a first casing 2 designed to house a clutch assembly, a second casing 4 designed to house the primary and secondary shafts of the gearbox (or, as in the case of the embodiment illustrated herein, to house the two primary shafts and the two secondary shafts, it being a double-clutch gearbox), and an electro-hydraulic actuation unit designated as a whole by the reference number 6.

Figure 1:
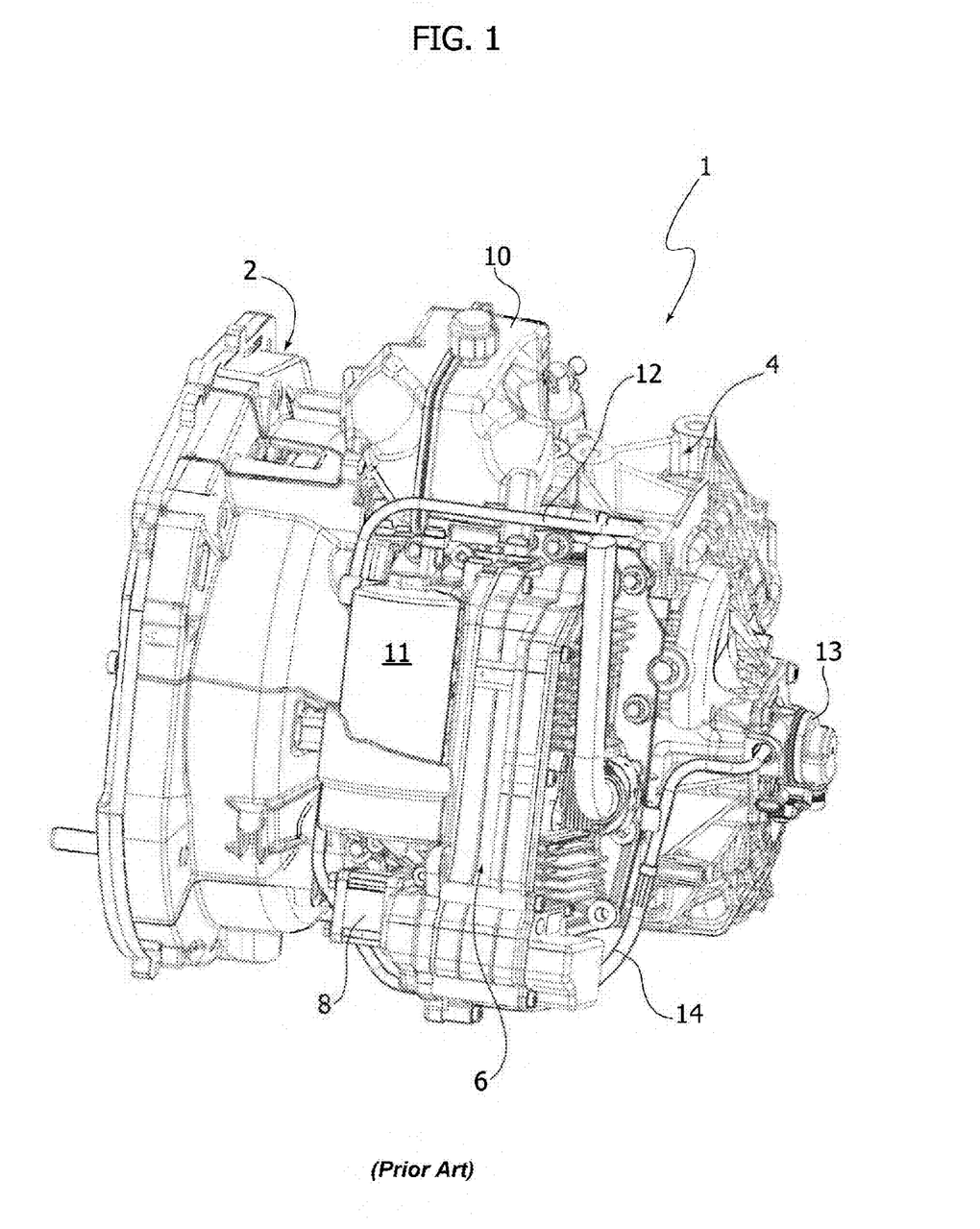
FIG. 1, which has been described previously, is a perspective view of a gearbox of a known type.

The electro-hydraulic actuation unit 6 includes a plurality of valve assemblies that regulate the oil flow to hydraulic actuators so as to carry out the operations of selection and engagement of the forward and reverse gear ratios of the gearbox 1.

Co-operating with the electro-hydraulic unit 6 is a hydraulic pump 8, driven via an electric motor, which intakes oil from a tank 10 set at the top of the casing 4. The pump 8 intakes an oil flow from the tank 10 and delivers it to the valve assemblies within the unit 6 and, simultaneously, to an accumulator 11 and—through the control of the valve assemblies within the electro-hydraulic actuation unit 6—to a first hydraulic line 12 and a second hydraulic line 14 that each lead to an actuator device of a corresponding clutch.

A first actuator device designated by the reference number 13 receives fluid from the line 14 and is configured for actuation of a first clutch of the gearbox 1, whereas a second actuator device, which receives fluid from the line 12, is configured for actuation of a second clutch of the gearbox 1 but is set inside it and is not visible in the figure.

As is known, the provision of an electrically driven hydraulic pump is necessary since it enables maintenance of the supply of hydraulic fluid to the electro-hydraulic unit 6 and hence to the actuators that manage selection and engagement of the gears even in conditions of engine stop of the motor vehicle on which the gearbox 1 is installed, for example, as a consequence of activation of the so-called "start and stop" and "free wheel" functions.

The solution illustrated in FIG. 1, of a known type and proposed by the present applicant, is liable to present certain drawbacks. In particular, it has a certain number of hydraulic lines arranged externally with respect to the ensemble of the casings 2 and 4, which renders the system more exposed to risks of damage caused by the action of external agents. Furthermore, the components necessary for creating external hydraulic lines for pressurized fluid entail a non-negligible impact on the production costs.

In the second place, in the known solution illustrated, the unit 6 uses, as hydraulic fluid, an oil that is stored in a separate tank (the tank 10), which is located outside the casings 2 and 4 and is different from the one that provides for lubrication of the gearbox.

It is evident that in this way an additional component is required (the tank 10), as well as an additional operation of assembly of the tank itself, with consequent increase in the costs and need to adopt different solutions for handling and moving the gearbox 1 on a production line.

The ensemble of the above complications leads in practice to higher production costs and greater drawbacks during assembly and handling of the gearbox 1.

Furthermore, the known solution represented in FIG. 1 is suited in particular for use on gearboxes of the double-clutch type in which the clutch assembly is of the dry type.

The inventors have, however, noted that the layout of the electro-hydraulic actuation system of FIG. 1 is somewhat inconvenient in the case where it were to be applied to a gearbox, in particular of a double-clutch type, where the clutch assembly is of the multidisc, wet, type.

OBJECT OF THE INVENTION

The object of the present invention is to solve the technical problems mentioned previously. In particular, the object of the invention is to provide a gearbox, preferentially of the double-clutch type, where the arrangement of the components of the electro-hydraulic system is optimized so as to minimize the production costs and the difficulties during assembly, and which is moreover particularly advantageous in the case where the clutch assembly of the gearbox is of the wet multidisc type.

SUMMARY OF THE INVENTION

The object of the invention is achieved by a gearbox, which has all the characteristics indicated at the start of the present description and is moreover characterized in that the second pump is configured for supplying hydraulic fluid taken in from a second intake environment to said gearbox, for lubrication thereof, and to said first intake environment.

BRIEF DESCRIPTION OF THE FIGURES

The invention will now be described with reference to the annexed figures, which are provided purely by way of non-limiting example and in which.

DETAILED DESCRIPTION OF PREFERRED EMBODIMENTS OF THE INVENTION

Figure 2:
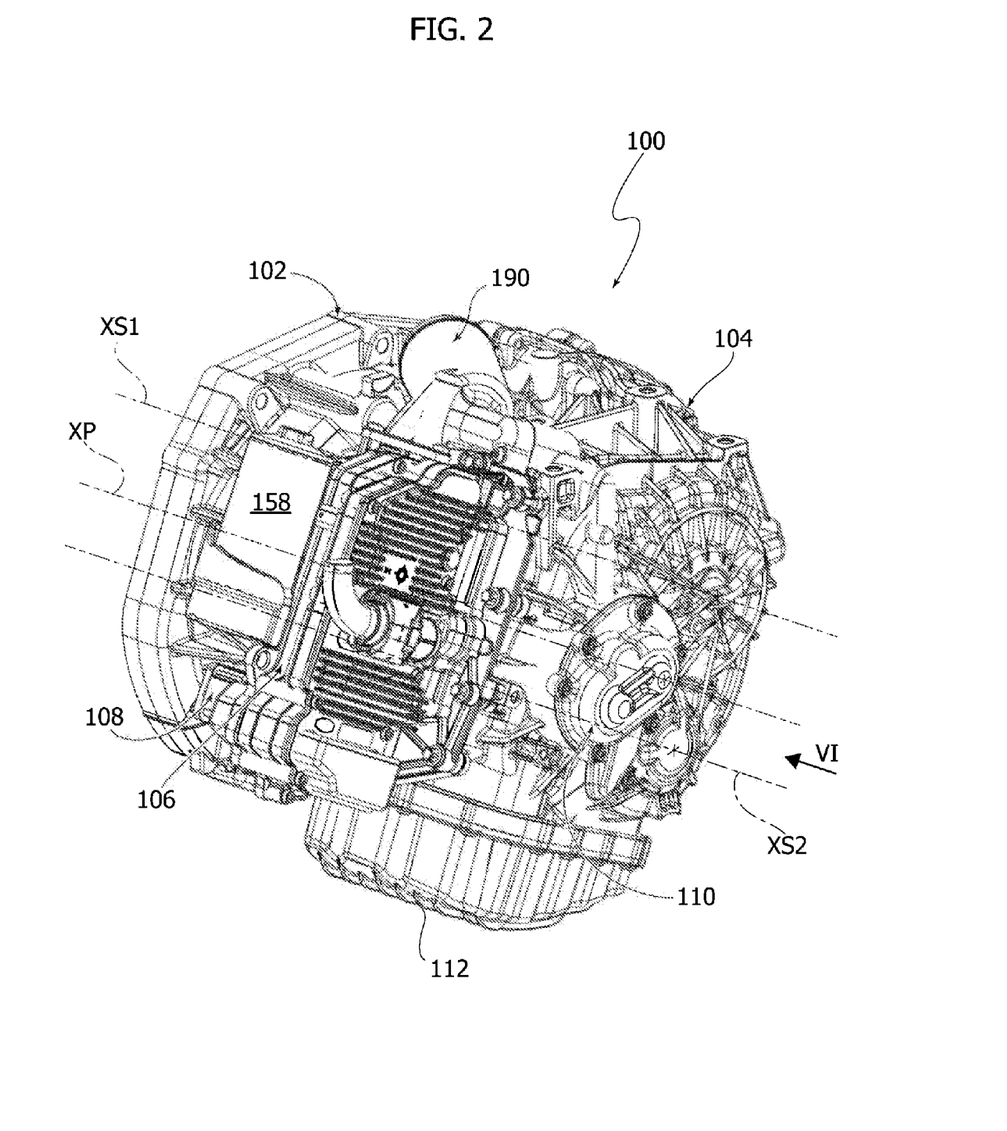
FIG. 2 is a perspective view substantially corresponding to that of FIG. 1 but illustrating a gearbox according to a preferred embodiment of the invention.

In FIG. 2 the reference number 100 designates a gearbox according to a preferred embodiment of the invention. The gearbox 100 includes a first casing 102 housed in which is a clutch assembly and a second casing 104 within housed in which are the primary and secondary shafts.

Figure 3:
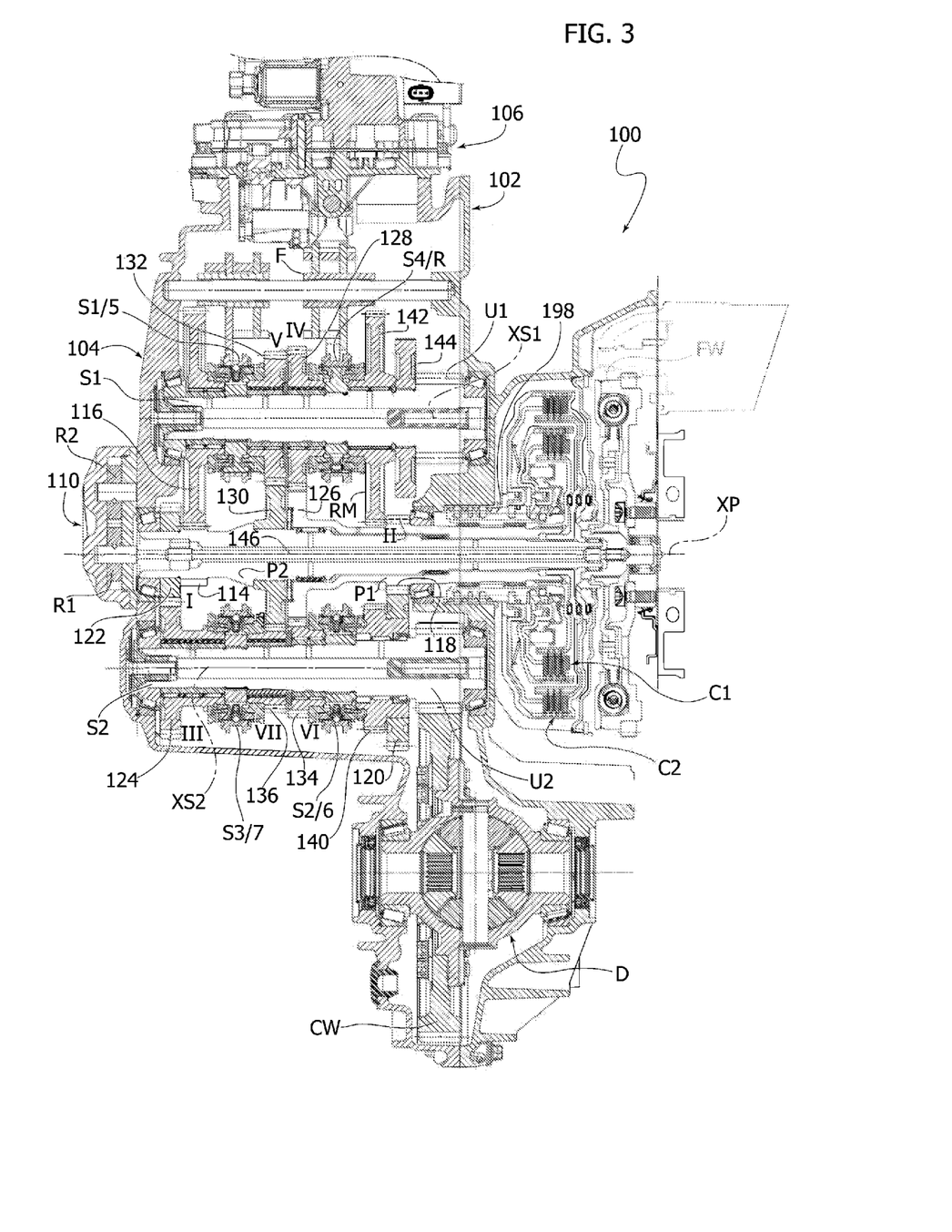
FIG. 3 is a longitudinal section of the gearbox of FIG. 2 obtained as ensemble of false cross-sectional views.

In the preferred embodiment illustrated herein the gearbox 100 is of the double-clutch type with clutch assembly of the multidisc wet type and consequently comprises two primary shafts arranged sharing a first axis XP and two secondary shafts, parallel to one another and to the primary shaft XP, arranged coaxially to a second axis XS1 and a third axis XS2 (see also FIG. 3). Moreover fixed to the casing 104 is an electro-hydraulic actuation unit 106, which is coupled to a first hydraulic pump 108. A second hydraulic pump 110 is, instead, connected to the casing 104 substantially in correspondence of the axis XP and the primary shafts. Finally, installed on the bottom of the casing 104 is an oil sump designated by the reference number 112.

With reference to FIG. 3, a first hollow primary shaft P1 is arranged coaxially to the axis XP and is operatively connected to a first clutch C1; housed inside the primary shaft P1 and rotatably mounted with respect thereto is a second primary shaft P2 operatively connected to a second clutch C2 having a greater diameter than the clutch C1 and substantially surrounding, the latter. The two clutches C1, C2 define a clutch assembly of the gearbox 100, are housed inside the casing 102, and are operatively connected to a flywheel FW (in particular to a clutch-damper device), which is in turn connected in rotation to the engine of the vehicle on which the gearbox 100 is installed.

The primary shaft P1 carries a plurality of gears fixed to it in rotation and associated to forward gear ratios of even order of the gearbox 100, whereas the primary shaft P2 carries a plurality of gears, which are also connected in rotation to it and are associated to forward gear ratios of odd order.

Rotatably mounted so as to share the axes XS1 and XS2 are a first secondary shaft S1 and a second secondary shaft S2 parallel to one another and to the primary shafts P1, P2, each of which carries a plurality of gears mounted idle and meshing with corresponding gears rigidly connected in rotation to the primary shaft P1 or P2 (because they are fitted on them or made of a single piece with them) for defining the forward and reverse gear ratios.

More in particular, the gearbox 100 comprises seven forward gear ratios and one reverse gear ratio (even though solutions in which a number of reverse gear ratios are envisaged are technically possible). All the gear ratios can be identified by means of the pairs of gears that will be hereinafter described in detail and are designated by progressive Roman numbers for each forward gear plus the reference RM for the reverse gear.

A first forward gear ratio (first gear, I) is defined by the meshing of a gear 114 made in a single piece with the primary shaft P2 and a gear 116, which is mounted idle on the secondary shaft S1 and can be connected in rotation to the latter by means of a first synchronizer S1/5.

A second forward gear ratio (second gear, II) is defined instead by the meshing of a gear 118 made in a single piece with the primary shaft P1 and a gear 120, which is mounted idle on the secondary shaft S2 and can be connected in rotation thereto by means of a second synchronizer S2/6.

A third forward gear ratio (third gear, III) is defined by the meshing of a gear 122 connected in rotation to the primary shaft P2 and a gear 124, which is mounted idle on the secondary shaft S2 and can be connected in rotation thereto by means of a third synchronizer S3/7.

A fourth forward gear ratio (fourth gear, IV) is defined by the meshing of a gear 126 made in a single piece with the primary shaft P1 and a gear 128, which is mounted idle on the secondary shaft S1 and can be connected in rotation thereto by means of a fourth synchronizer S4/R.

A fifth forward gear ratio (fifth gear, V) is defined by the meshing of a gear 130 connected in rotation to the primary shaft P2 and a gear 132, which is mounted idle on the secondary shall S1 and can be connected in rotation thereto by means of the synchronizer S1/5 referred to previously.

A sixth forward gear ratio (sixth gear, VI) is defined by the meshing of the gear 126 and a gear 134, which is mounted idle on the secondary shaft S2 and can be connected in rotation thereto by means of the synchronizer S2/6.

A seventh forward gear ratio (seventh gear, VII) is defined by the meshing of the gear 130 and a gear 136, which is mounted, idle on the secondary shaft S2 and can be connected in rotation thereto by means of the synchronizer S3/7.

Finally, a reverse gear ratio (reverse gear, RM) of the gearbox 100 is defined by the meshing of the gear 118 with the gear 120, which is in turn connected in rotation to a gear sleeve 140, which is rotatably supported (i.e., is mounted idle) on the secondary shaft S2, thus rendering also the gear 120 idle with respect to the secondary shaft S2. The gear sleeve 140 in turn meshes with a gear 142, which is mounted idle on the secondary shaft S1 and can be connected in rotation thereto by means of the synchronizer S4/R.

The ensemble of the gear sleeve 140 and of the gear 120 hence have only the function of transmission of the motion (and of reversal of the motion) towards the gear 142, which hence enables transmission of the movement in a direction opposite to the forward direction thanks to the engagement of the synchronizer S4/R.

The secondary shafts S1 and S2 moreover terminate, on one and the same side, With respective output pinions U1, U2, which mesh with a crown wheel CW of a differential D, by means of which the motion is transmitted to the drive wheels. The differential D is likewise housed in a portion of the casing 104.

The two secondary shafts S1 and S2 are hence output shafts of the gearbox 100 and transmit the motion from the engine to the differential through the output pinions U1 (and clearly the forward and/or reverse gear ratios).

On the secondary shaft S1 a further gear is present connected in rotation thereto and designated by the reference 144, which forms part of a mechanism for blocking the gearbox, which can be activated when the vehicle is parked (parking lock).

At the top in the representation of FIG. 3 there may be seen in cross section the electro-hydraulic actuation unit 106, which controls a plurality of hydraulic actuators (as will be described in detail hereinafter), which are configured for moving a plurality of fork actuation devices, which are here designated as a whole by the reference F and each of which is associated to a corresponding one of the synchronizers S1/5, S2/6, S3/7, and S4/R.

With reference once again to FIG. 3, it should be noted that, according to an advantageous aspect of the invention, the primary shaft P2 is also made hollow and housed inside it, in a position sharing the axis XP, is a transmission rod designated by the reference number 146. The transmission rod 146 is connected in rotation to the flywheel FW of the engine of the motor vehicle on which the gearbox 100 is installed and, at the opposite end, is connected in rotation to a first rotor R1 of the second hydraulic pump 110. The hydraulic pump 110, in the embodiment represented here, is in fact of the double-rotor external-gear type, where the rotor R1 is the driving rotor, whereas a second rotor R2 constitutes the driven rotor. Both of the rotors R1 and R2 are housed inside the casing of the pump 110, which is fixed to the casing 104, as may be seen in FIGS. 3 and 2.

The rigid connection in rotation of the rotor R1 to the flywheel FW ensures that the hydraulic pump 110 is always driven in rotation by the engine of the vehicle on which the gearbox 100 is installed, even when one or both of the clutches C1 and C2 are open or the gearbox is in the neutral position.

Figure 4:
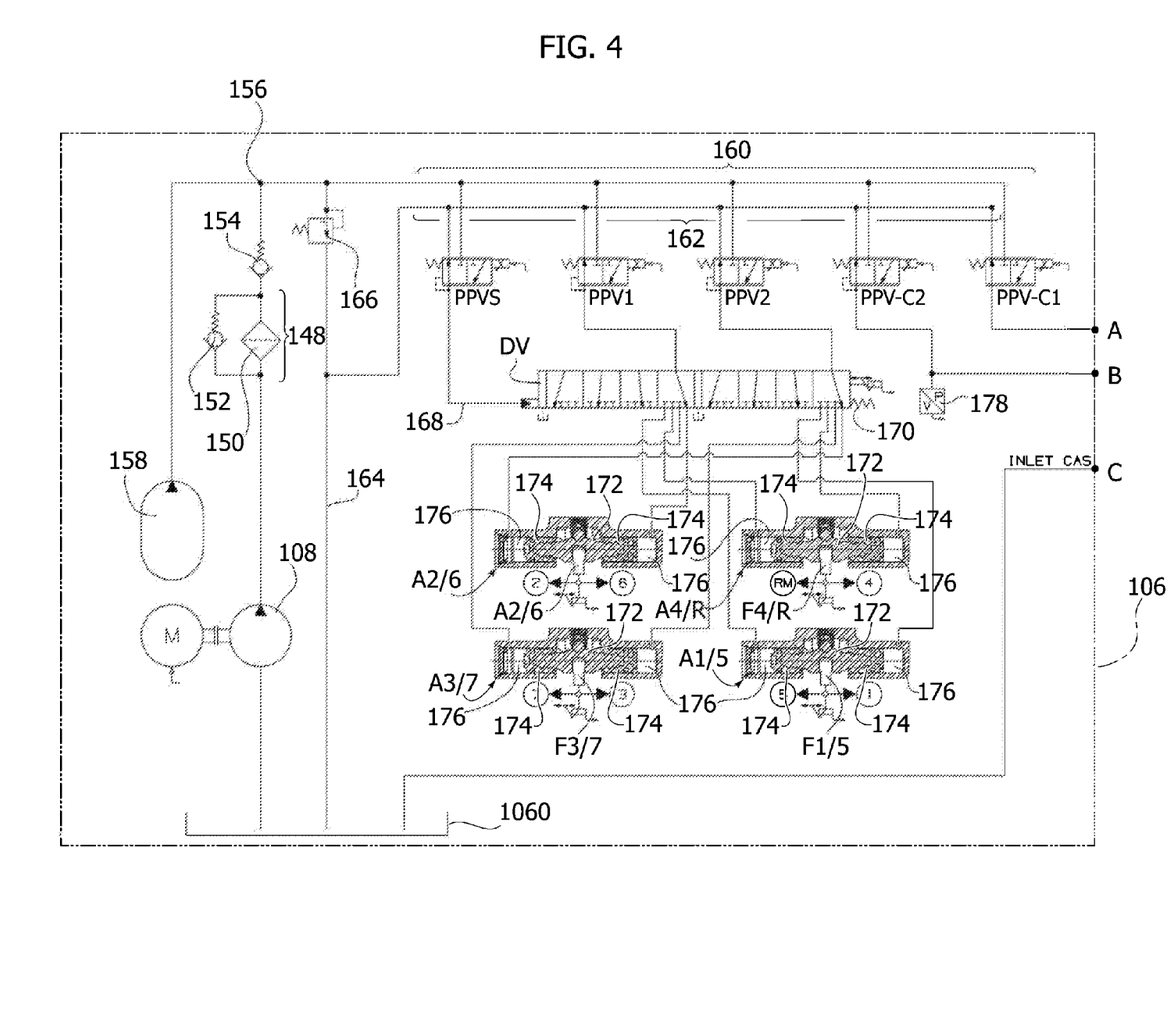
FIG. 4 is a schematic view of a first portion of an electro-hydraulic system of the gearbox of FIG. 2.
Figure 5:
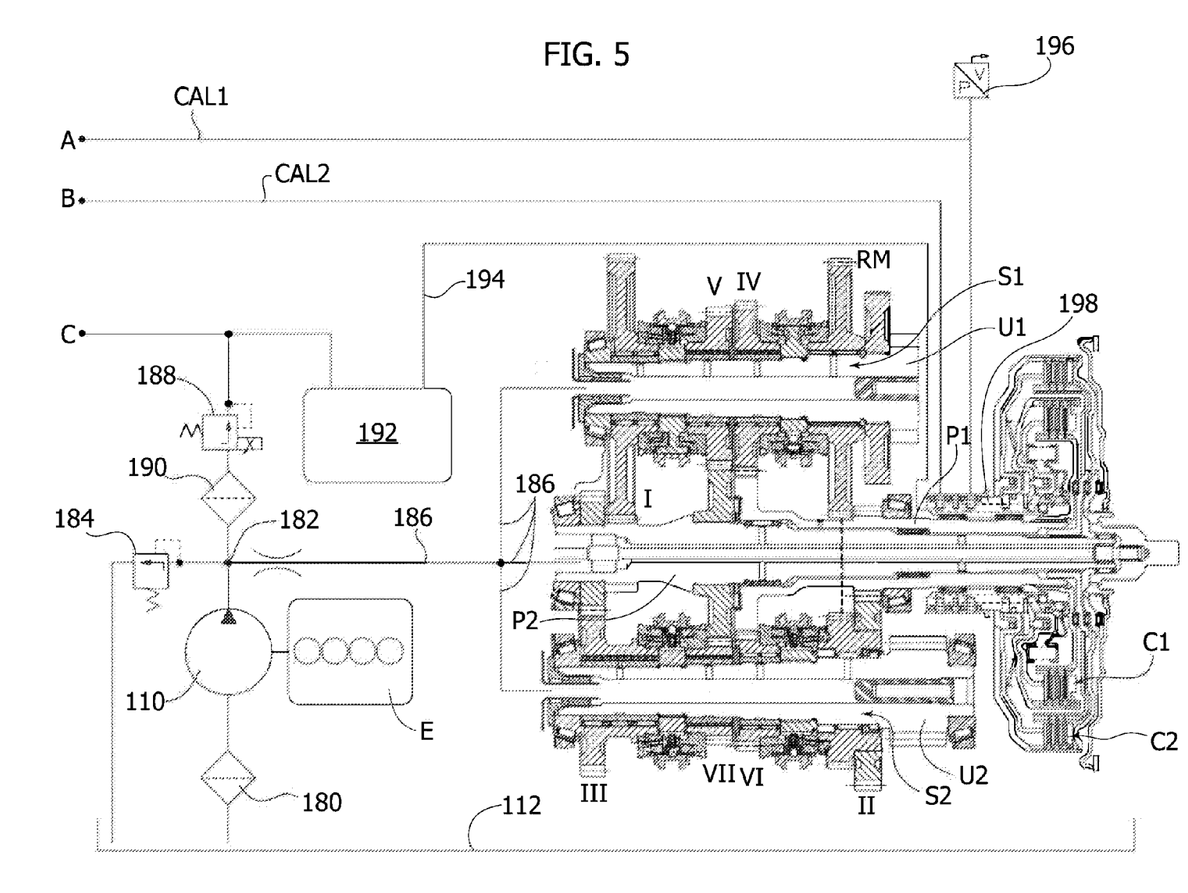
FIG. 5 is a view of a second portion of the electro-hydraulic system already illustrated in FIG. 4.

With reference to FIGS. 4 and 5, a system for electro-hydraulic control of the gearbox 100 will now be described With the aid of the schematic circuit illustrations appearing therein.

In the case in point, FIG. 4 includes a schematic circuit illustration of a first section of the electro-hydraulic system of the gearbox 100 (in particular, of the circuit of the electro-hydraulic actuation unit 106 and of the first hydraulic pump 108), whereas FIG. 5 contains a schematic circuit illustration of a second section of the electro-hydraulic system of the gearbox 104 (in particular, of the second hydraulic pump 110 and of the members of the gearbox). The dashed and double-dotted box that encloses FIG. 4 defines substantially the boundaries of the electro-hydraulic unit 106 (pump 108 excluded).

With reference to FIG. 4, the first hydraulic pump 108 is driven in rotation by means of an electric motor designated as a whole by the reference M and comprises an intake port hydraulically connected to a first intake environment 1060, which is constituted by a drainage volume of the electro-hydraulic actuation unit 106 itself.

A delivery port of the pump 108 is instead hydraulically connected to a filtering assembly 148 including a filter 150 and a one-way bypass valve that prevents blocking of the oil flow in the event of clogging of the filter. Arranged downstream of the filtering assembly 148 is a second one-way valve 154 that prevents emptying of the hydraulic circuit downstream thereof. Downstream of the valve 154 branching off from a node 156 is a hydraulic line that leads to an accumulator 158, which is visible also in FIG. 2 designated by the same reference number and is functionally similar to the accumulator 11 of the gearbox of FIG. 1.

Branching off from the node 156 is also a first manifold line 160, from whose nodes, in turn, five hydraulic lines branch off which lead to as many proportional solenoid valves designated by the references PPVS, PPV1, PPV2, PPV-C2 and PPV-C1.

Each of the aforementioned solenoid valves leads out onto a second manifold line 162 which, unlike the line 160, manages a flow of hydraulic fluid discharged towards the intake environment 1060 through a return line 164.

It should moreover be noted that the lines 160, 162 are associated to portions at different pressure within the hydraulic circuit of the unit 106, which constitutes in general a high-pressure section of the electro-hydraulic system of the gearbox 100.

This is witnessed by the fact that a pressure-limiting valve 166 is inserted precisely astride of the lines 160 and 162 with a direction of flow that corresponds to the discharge of flow from the environment associated to the line 160 to the environment to which also the line 162 is associated, since the pressure on the line 160 is higher than the pressure on the line 162 (practically equal to ambient pressure).

The solenoid valves PPVS, PPV1 and PPV2 are hydraulically and operatively connected to a distribution valve DV with five ways and four positions, all of which doubled. In particular, the valve PPVS controls a driving line 168 that acts on a surface of influence of the distribution valve DV and enables switching thereof (i.e., carries out movement of a moving element thereof) against the action of an elastic element 170.

The valves PPV1 and PPV2 control the flow of hydraulic fluid in hydraulic lines that are alternatively connected to the chambers of corresponding actuators A1/5, A2/6, A3/7 and A4/R. The reference for each actuator represents the association with the fork actuation elements of the synchronizers bearing a corresponding numbering. Each of the aforesaid actuators comprises a moving element 172 bearing at the ends a pair of plungers 174 in turn inserted in chambers 176, leading into which are hydraulic lines that can be managed by the distribution valve DV.

Finally, the solenoid valves PPV-C2 and PPV-C1 control the flow rate of hydraulic fluid towards actuation elements of the clutches C2 and C1, respectively. With reference to FIGS. 4 and 5, the electro-hydraulic actuation unit 106, which defines a high-pressure section of the electro-hydraulic system of the gearbox 100, hence includes three connection interfaces with the low-pressure section, which are here associated to the letters A, B, C, each associated to distinct hydraulic lines.

In particular, the interface designated by the letter A is associated to a hydraulic line connected to the valve PPV-C1, the interface designated by the letter B is associated to a hydraulic line connected to the valve PPV-C2, moreover installed on which is a pressure transducer 178.

The interface designated by the letter C is, instead, associated to a hydraulic line which leads directly to the intake environment 1060, i.e., the drainage environment of the actuation unit 106.

With reference to FIG. 5, the second hydraulic pump 110 is driven in rotation, via the transmission rod 146, by the engine, preferentially a thermal engine, by the motor vehicle on which the gearbox 100 is installed.

The pump 110 includes an intake port, which is hydraulically connected to a second intake environment, which is defined by the oil sump 112 already described with reference to FIG. 2. A filtering element 180 is preferentially set between the intake port of the pump 110 and the intake environment 112. The delivery of the hydraulic pump 110 leads, instead, onto a node 182 from which there depart three distinct hydraulic lines:
- a first hydraulic line, on which a pressure-relief valve 184 is inserted and which returns directly to the oil sump 112;
- a second hydraulic line designated by the reference 186, which leads, in an axial direction, to the primary shafts P1, P2 and to the secondary shafts S1 and S2, all of which are hollow for the lubrication thereof and for lubrication of the gears of the gearbox 100; and
- a third hydraulic line, interposed on which is a pressure-reducer solenoid valve 188 (preferentially set upstream of which is a filter 190, visible also in FIG. 2) which leads out onto the interface designated by the letter C and a heat exchanger for the oil designated by the reference number 192.

Departing moreover from the heat exchanger 192 is a line 194 that conveys hydraulic fluid to the clutch assembly for lubrication and cooling of the clutches C1, C2.

It should be noted that also in FIG. 5 the interfaces A, B, C appear in order to emphasize further the connection and continuity between the two circuits, which only fix reasons of space cannot be reproduced on one and the same sheet of drawings.

Proceeding from top down, departing from the interfaces A, B are two clutch-actuation hydraulic lines CAL1 and CAL2 which convey hydraulic fluid for actuation of the clutches C1 and C2, respectively. A pressure transducer 196 is preferentially set on the line CAL1.

It should once again be noted that the hydraulic line downstream of the pressure-reducer valve 188 coincides with the hydraulic line that goes directly to the intake environment 1060.

Figure 9:
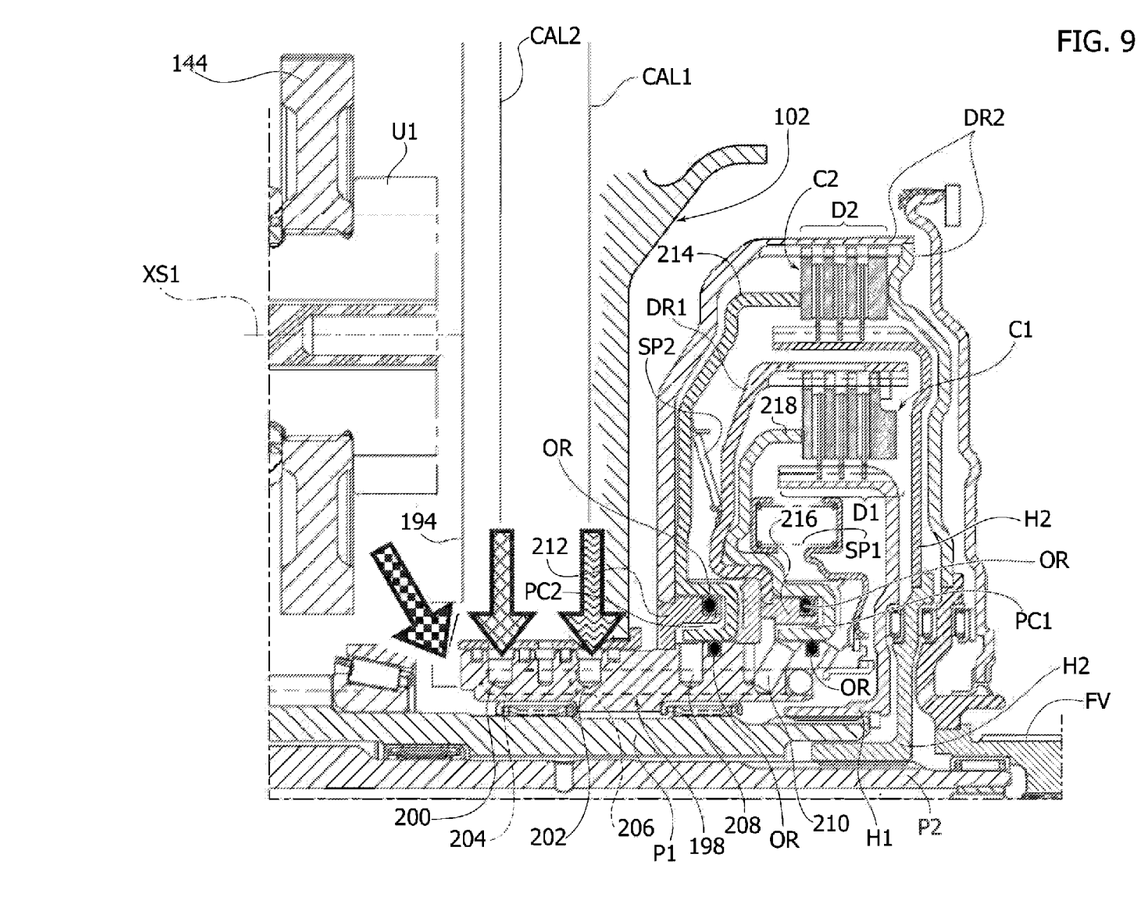
FIG. 9 is a partially sectioned view of a clutch assembly of the gearbox forming the subject of the invention, which illustrates a further route of the hydraulic fluid.

With reference to FIG. 9, the clutch assembly will now be described structurally in detail, and in particular a component that makes it possible to send pressurized fluid to actuators of each of the clutches C1, C2.

The clutch C2 comprises a drum DR2 connected in rotation to the flywheel FW (in particular to a clutch-damper element mounted thereon). The drum DR2, which is in turn connected in rotation with a rotary distributor 198, includes a plurality of sets of holes reproduced circumferentially thereon and in which each set includes:
- a first radial hole 200 and a second radial hole 202;
- a first axial hole 204 and a second axial hole 206 in fluid communication with the first and second radial holes 200, 202, respectively; and
- a third radial hole 208 and a fourth radial hole 210 in fluid communication with the first and second axial channels 204, 206, respectively.

The hole 208 of each set is in fluid communication with a first pressurized fluid chamber of an annular shape designated by PC2 and defined between a collar 212 fitted on the rotary distributor 198 and a pressure element 214, Which is configured for compressing a disk pack D2 of the clutch C2. A pair of O-rings designated by the reference OR are arranged one in a groove made on the ring 212 at the interface with the pressure element 214 and the other in a groove made on the rotary distributor 198, once again at the interface with the pressure element 214 so as to guarantee fluid tightness of the chamber PC2, An actuator assembly for the clutch C2 is thus defined.

The disk pack D2 comprises a plurality of disks connected in rotation to the drum DR2, and the remaining disks (preferentially those bearing the friction gaskets) are connected in rotation to a hub H2 of the clutch C2, Which is in turn connected in rotation to the primary shaft. P2 by means of a grooved profile.

The clutch C1, like the clutch C2, comprises a drum DR1, which is fitted on, and connected in rotation to, the rotary distributor 198 in a position corresponding to the drum DR1; the hole 210 of each assembly is in fluid communication with a second pressurized fluid chamber designated by PC1 and defined by a ring 216 fitted on the rotary distributor 198 together with the drum DR1 and by a pressure element 218 of the clutch C1.

In a way similar to what has already been described for the clutch C2, a pair of O-rings designated by OR are housed in a groove made on the ring 216 at the interface with the pressure element 218 and in a groove made on the rotary distributor 198 once again at the interface with the pressure element 218 so as to guarantee tightness for the hydraulic fluid within the chamber PC1. In the same way as for the clutch C2, an actuator assembly for the clutch C1 is thus defined.

The pressure element 218 is itself configured for applying an axial pressure on a disk pack D1 of the clutch C1. The disk pack D1 includes a plurality of disks connected in rotation to the drum DR1 and the remaining disks (preferentially those provided with friction gaskets) are connected in rotation to a hub H1 of the clutch C1, which is in turn connected in rotation to the primary shaft P1 by means of a splined coupling.

The pressure element 214 of the clutch C2 is kept in the resting position (which corresponds to a condition of opening of the clutch C2) by means of a diaphragm spring SP2, which bears on the pressure element 214 itself and on the drum DR1 of the clutch C1.

The pressure element 218 of the clutch C1 is, instead, kept in the resting position (which corresponds to a condition of opening of the clutch C1) by means of a pack of springs SP1, which are preferentially cylindrical and are arranged with axial orientation.

From the above description, it may hence be appreciated that the two clutches C1 and C2 are of the normally open type.

Finally, it should be noted that the ensemble of the two drums DR1 is DR2 carried by the rotary distributor 198 is able to rotate with respect to the primary shaft P1 thanks to roller cages set between them.

Operation of the gearbox 100 is described in what follows.

With reference to FIG. 4 and to FIG. 5, as already mentioned the components represented therein define, respectively, a high-pressure section of the system for hydraulic actuation of the gearbox 100 (FIG. 4) and a low-pressure section of the aforesaid system (FIG. 5). The hydraulic fluid used is oil, and is the same for the two sections of the circuit. Except where otherwise specified, in the description the terms "hydraulic fluid" and "oil" are used with the same meaning.

As regards the flow rates of hydraulic fluid that traverse the two sections, the low-pressure section processes a high flow rate of hydraulic fluid, whereas the high-pressure section processes a lower flow rate of hydraulic fluid, which is substantially necessary just for supply of the actuators A1/5, A2/6, A3/7 and A4/R plus the actuators of the clutches C1, C2 (chambers PC1, PC2).

During operation of the vehicle on which the gearbox 100 is installed, the first hydraulic pump 108 is driven in rotation by the electric motor M and is configured for supplying the electro-hydraulic actuation unit 106 with hydraulic fluid taken in from the first intake environment 1060.

In particular, the pump 108 supplies oil under pressure to the accumulator 158, which functions as energy reserve in the transients, and to the first manifold line 160 for supply of the proportional valves PPVS, PPV1, PPV2, PPV-C2 and PPV-C1.

The modalities with which the distributor DV and the proportional valves are actuated are in themselves known and will not be described any further. It will suffice, for the purposes of the present description, to point out that each proportional valve has a resting (or discharge) operating position, where the hydraulic fluid is delivered from the environment downstream thereof (i.e., from the environment that comprises the distributor DV and the four actuators) towards the return line 164, and a working (or delivery) position, which is assumed by energizing the corresponding solenoid and in which a delivery of hydraulic fluid from the manifold line 160 to the respective user is enabled.

In the case of the valves PPV-C2 and PPV-C1, the delivery of hydraulic fluid is in the direction of the clutch assembly. In particular, through the clutch-actuation hydraulic lines CAL2 and CAL1 the pressurized hydraulic fluid goes, respectively, to the holes 200 and 202. From these it reaches, through the respective channels 205, 204, the holes 208, 210 and, from the latter, the corresponding pressurized fluid chambers PC2 and PC1.

Given that the clutches C1, C2 are of the normally open type, in order to keep them in the closed position and enable transmission of motion to the wheels of the vehicle it is essential to keep the fluid within the chambers PC1 or PC2 under pressure.

Countering the action exerted by the fluid in the chambers PC1 and PC2 are the springs SP1 and SP2 described previously.

As regards the low-pressure section, with reference to FIG. 5, the second hydraulic pump 110 is driven in rotation by the engine of the vehicle through the transmission rod 146 and is configured for drawing off a flowrate of hydraulic fluid from the oil sump 112 that is much greater than the one processed by the pump 108.

The pump 110 supplies a part of the flowrate of fluid taken in from the sump 112 to the gearbox for lubrication thereof.

Exploiting in fact the hollow geometry of each of the shafts of the gearbox P1, P2 and S1 and S2, the hydraulic fluid is sent axially inside the shafts in such a way that it can diffuse radially through a plurality of radial holes provided on the walls of the shafts themselves, thus lubricating the gears and the shafts of the gearbox.

The part of flow that does not reach, in the axial direction, the shafts P1, P2, S1 and S2 for lubrication of the gearbox is, instead, delivered by the pump 110 through the filter 190 and through the pressure-reducer valve 188, from where it further divides into a second part, which goes to the heat exchanger 192 and to the line 194 and consists in the flowrate of hydraulic fluid for lubrication and cooling of the clutch assembly, and a third part, which is supplied directly to the first intake environment 1060.

It should be noted that the flow of hydraulic fluid processed by the pump 110 which is for lubrication and cooling of the clutch assembly is sent through an intake port, located up against the rotary distributor 198. All the fluid that lubricates the shafts and the gears of the gearbox and that lubricates and cools the clutch assembly is finally sent to the sump 112 and from there is recirculated by the pump 110.

It should hence be noted that the pump 110 has the dual function of supplying the gearbox with oil for lubrication and cooling of the clutch assembly but has also the function of delivering a part of the oil flow towards the intake of the first pump 108, thus preventing the need for the latter to be provided with an external tank. This consequently solves one of the problems mentioned at the start of the description, in so far as it thus becomes possible to eliminate the tank set at the top of the casing 104 and reduce to the bare minimum the number and length of the external pipes, with consequent considerable reduction of the costs and risks of damage. There is moreover no longer the need to use two different oils inside the gearbox (one for lubrication, and one for actuation), as instead happens in the gearbox 1.

In addition, by exploiting the cavity within the primary shaft P2 for housing the transmission rod 146, it is possible to eliminate the external actuator device for the clutches C1 and C2 present in the gearbox 1 of a known type and it is hence possible to eliminate also the corresponding external piping. The oil is thus routed through a path inside the casing 104, which does not entail all the drawbacks described previously.

Figure 6:
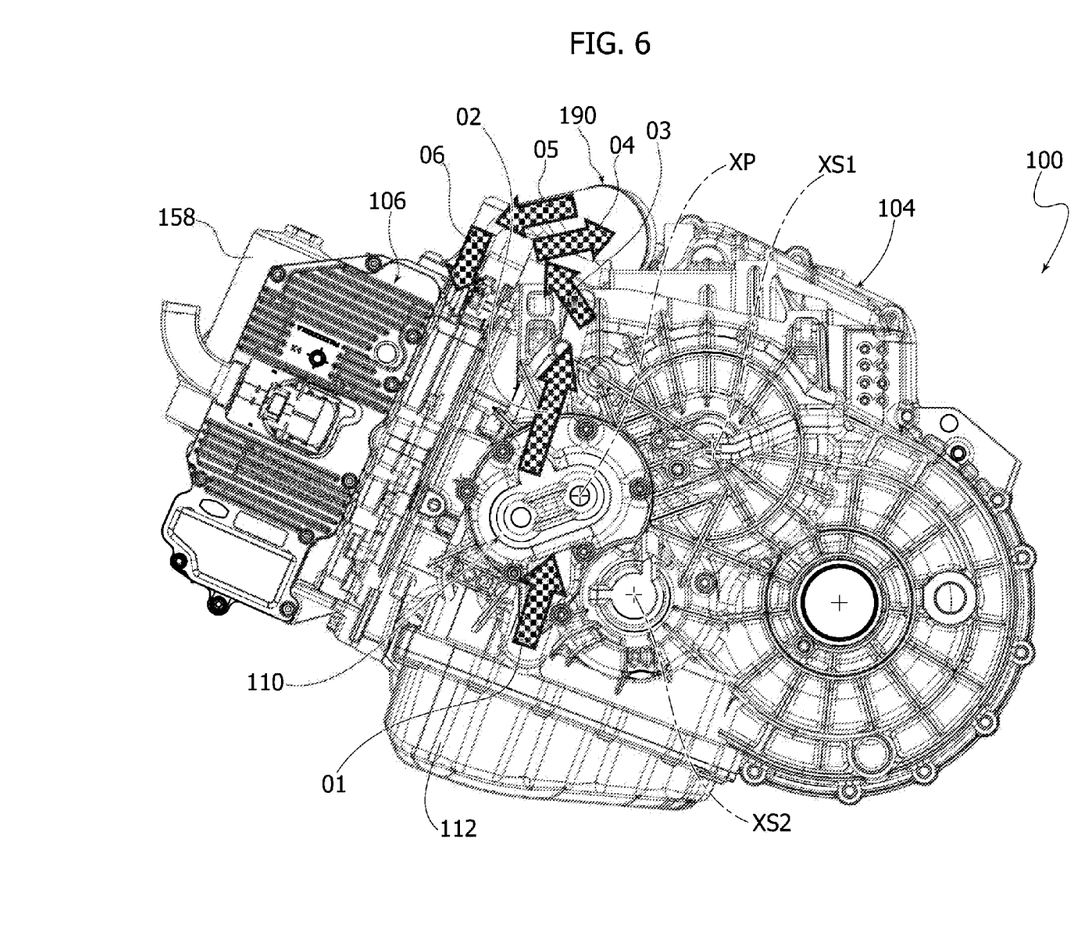
FIG. 6 is a view according to the arrow VI of FIG. 2 illustrating schematically a route of the hydraulic fluid within the gearbox forming the subject of the invention.
Figure 7:
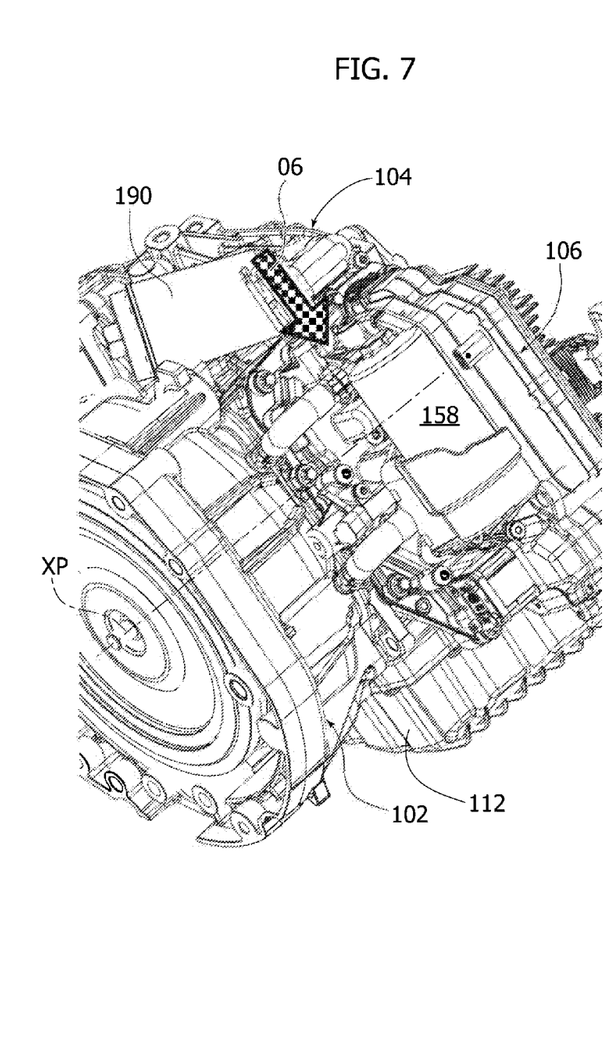
FIGS. 7 and 8 are perspective views similar to that of the gearbox of FIG. 2, each of which illustrates a different route of the hydraulic fluid within the gearbox forming the subject of the invention.
Figure 8:
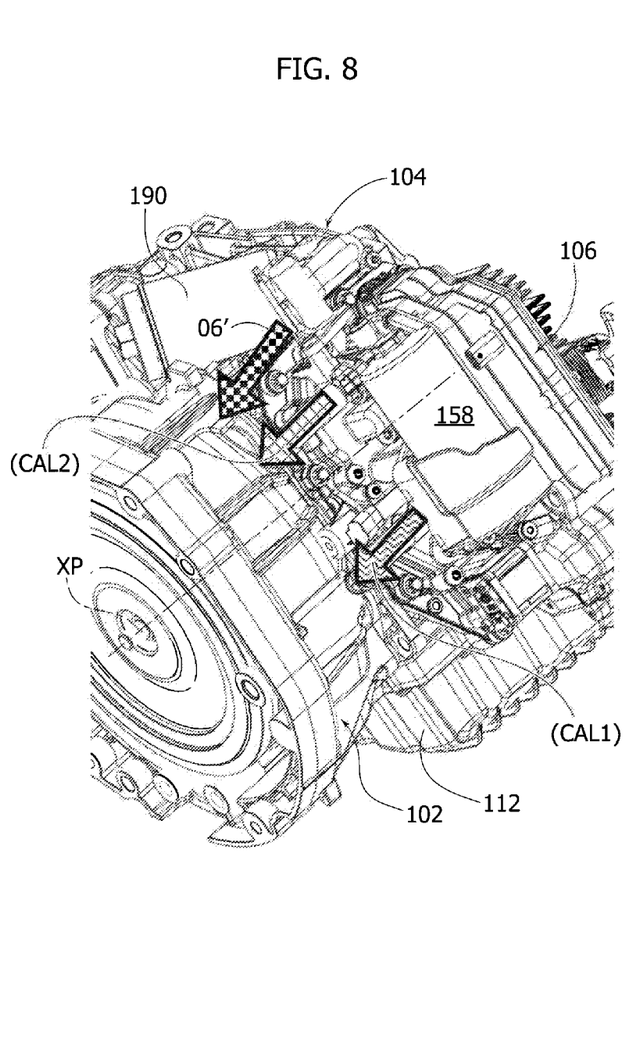

Reference may be made for this purpose to FIGS. 6, 7, and 8, which illustrate a portion of the gearbox 100 viewed from outside in which the route of the oil in the low-pressure section of the gearbox 100 has been highlighted with an arrow with a chequered pattern. The arrangement of the arrows reproduces with sufficient approximation that of the channels inside the casing 104 in which the hydraulic fluid passes.

In particular, it should be noted starting from the bottom of FIG. 6, that the first arrow designated by 01 represents the delivery of oil from the sump 112 to the intake of the second pump 110; a second arrow designated by 02 and a third arrow designated by 03 indicate, instead, the delivery of oil from the pump 110 to the filter 190.

The arrows 04 and 05 indicate the route of the oil inside the filter 190 (inlet/outlet respectively), whereas a last arrow 06, visible also in FIG. 7 indicates the inlet of oil into the intake environment 1060 of the electro-hydraulic actuation unit 106. An arrow 06' in FIG. 8 indicates, instead, the part of flow that goes to the rotary distributor 198 for lubrication and cooling of the clutch assembly.

Once again in FIG. 8 there may be appreciated:
- the routes of the hydraulic fluid coming from the electro-hydraulic actuation unit 106 for supply of the sequences of holes 200-204-208 (CAL2) and 202-206-210 (CAL1) and hence of the chambers PC2, PC1 for actuation of the clutches C2, C1; and
- the route of the hydraulic fluid delivered by the pump 110 through the line 194 for cooling and lubrication of the clutches C1, C2.

For the above purpose it should be noted that the arrow with a squared pattern is associated to the hole 202 and hence to supply of the chamber PC2, whereas the arrow with a wavy pattern is associated to the oil that enters the hole 202 and then goes into the chamber PC1.

Basically, the arrows with a chequered pattern, a squared pattern, and a wavy pattern of FIG. 8 indicate, respectively, the path of the hydraulic fluid in the lines 194, CAL2 and CAL1.

The arrow 06 of FIG. 7 indicates, instead, the line that goes the tank 1060 of FIG. 4.

In summary, the electro-hydraulic system of the gearbox 100 is characterized by the presence of two sections:
- the first, at a high pressure (and low flowrates), forming part of which are the pump 108 and the unit 106, where the flow of hydraulic fluid processed by the pump 108 is exploited in part for the operations of selection and engagement of the gears via the electro-hydraulic actuation unit 106, in particular through the valve DV and the actuators A1/5, A2/6, A3/7, A4/R, and in part for actuation of the clutches C1, C2 through the lines CAL1 and CAL2 and the rotary distributor 198; and the second, at a low pressure (and high flowrates), forming part of which is the pump 110, where the flow of fluid processed by the pump 110 is exploited in part for lubrication of the members of the gearbox, in part for lubrication and cooling of the clutches C1, C2 through the line 194, and in part is delivered to the intake environment 1060 of the pump 108.

Advantageously, practically all of the aforementioned lines are preferentially provided within the casings of the components, as already mentioned. However, as in the case of the lines CAL1 and CAL2, it is possible for short stretches thereof, as may be seen in FIG. 8, to develop on the outside of the casings 102 and 104 but to have a position and a length such as to render the risk of damage substantially zero. The fact that there is no need to adopt pipes that are external to the casings and have appreciable length moreover enables reduction of the costs.

Of course, the details of the embodiments may vary widely with respect to what has been described and illustrated herein, without thereby departing from the scope of the invention, as defined by the annexed claims.

In particular, even though the preferred embodiment exemplified herein envisages the use of a clutch assembly with two multidisc wet clutches, it is possible to apply the same electro-hydraulic system to dry clutches. Of course, this applies in the case of both single-clutch and double-clutch gearboxes.

In the case of double-clutch gearboxes with dry clutches the layout of the system could be kept as such, and the lines CAL1 and CAL2 could be arranged so as to carry out actuation of the dry clutches. Clearly the line 194 and the exchanger 192 would not be present. In the case of single-clutch gearbox, either dry or wet, just one of the lines CAL1 or CAL2 would be sufficient. In the case where a dry clutch is used, it is evident that the pump 110 could serve only for delivering oil to the first hydraulic pump 108, it not being necessary to cool and lubricate the clutch.

What is claimed is:

1. A gearbox for a motor vehicle including:
   a plurality of forward gear ratios and at least one reverse gear ratio,
   an electro-hydraulic actuation unit configured for the selection and the engagement of said gear ratios, the gearbox comprising a first hydraulic pump and a second hydraulic pump, wherein:
   the first hydraulic pump is driven in rotation by an electric motor and is configured for supplying hydraulic fluid taken in from a first intake environment to said electro-hydraulic actuation unit;
   the second hydraulic pump is driven in rotation by an engine of said motor vehicle, and
   said second hydraulic pump configured for supplying hydraulic fluid taken in from a second intake environment to said gearbox, for lubrication thereof, and to said first intake environment;
   said first intake environment being a drainage volume of said electro-hydraulic actuation unit;
   said second intake environment being an oil sump fixed to a casing of said gearbox;
   wherein a delivery of the second hydraulic pump leads onto a node wherefrom three distinct hydraulic lines depart including:
   a first hydraulic line, whereon a pressure-relief valve is inserted and which returns to the oil sump;
   a second hydraulic line leading to shafts of the gearbox for the lubrication thereof and for lubrication of the gears of the gearbox; and
   a third hydraulic line interposed on which is a pressure-reducer solenoid valve, which leads to said first intake environment.

2. The gearbox according to claim 1, comprising an electro-hydraulic system including:
   a high-pressure section, of which said first hydraulic pump and said electro-hydraulic actuation unit form part; and
   a low-pressure section, of which said second hydraulic pump forms part.

3. The gearbox according to claim 2, wherein said gearbox has a clutch assembly including a first clutch and a second clutch, and includes a first primary shaft and a second primary shaft arranged coaxially and a first secondary shaft and a second secondary shaft, parallel to said first and second primary shafts, each primary shaft being associated to a corresponding clutch and carrying respective gear wheels meshing with corresponding gear wheels of said first and second secondary shafts for defining said forward-gear and reverse-gear ratios.

4. The gearbox according to claim 3, wherein said first and second primary shafts are hollow, wherein said first primary shaft houses within it said second primary shaft, and wherein said second primary shaft houses within it a transmission rod connected in rotation to the engine of a motor vehicle on which said gearbox is installed and connected in rotation to a rotor of said second hydraulic pump for the transmission of the motion from said engine to said second hydraulic pump.

5. The gearbox according to claim 4, wherein said second hydraulic pump is of the gear type and includes said rotor as driving rotor and a further rotor as driven rotor.

6. The gearbox according to claim 3, wherein said clutch assembly comprises a first wet multidisc clutch and a second wet multidisc clutch mounted coaxially, wherein said first multidisc clutch is associated to said first primary shaft and is housed within said second multidisc clutch, said second multidisc clutch being in turn associated to said second primary shaft, each of the multidisc clutches having a respective drum connected in rotation to a rotary distributor rotatably mounted on said first primary shaft.

7. The gearbox according to claim 6, wherein the flow of hydraulic fluid processed by said first pump is exploited in part for the operations of selection and engagement of the gears of said gearbox via said electro-hydraulic actuation unit and in part for actuation of the clutches through the lines and the rotary distributor.

8. The gearbox according to claim 6, wherein the flow of fluid processed by said second pump is exploited in part for lubrication of said gearbox, in part for lubrication and cooling of the clutches, and in part is transferred to said first intake environment.

9. The gearbox according to claim 8, wherein the portion of flow processed by said second hydraulic pump that is exploited for lubrication and cooling of the clutches is delivered through an inlet port located up against said rotary distributor.

10. The gearbox according to claim 6, wherein said rotary distributor includes a plurality of sets of holes replicated circumferentially thereon and wherein each set includes:
    a first radial hole and a second radial hole;
    a first axial channel and a second axial channel in fluid communication with said first radial hole and said second radial hole, respectively; and a third radial hole and a fourth radial hole in fluid communication with said first and second axial channels, respectively.

11. The gearbox according to claim 10, wherein the third and fourth radial holes of each of said sets are in fluid communication with a respective pressurized fluid chamber of an actuator of a corresponding one of said second clutch and said first clutch.

12. The gearbox according to claim 11, wherein the portion of flow processed by said first hydraulic pump that is exploited for actuation of the clutches goes to each set of said first and second radial holes through a first hydraulic actuation line and a second hydraulic actuation line.

\* \* \* \* \*